United States Patent
Alonso et al.

(10) Patent No.: US 10,768,000 B2
(45) Date of Patent: Sep. 8, 2020

(54) CONTENT PRESENTATION BASED ON TRAVEL PATTERNS

(71) Applicant: Microsoft Corporation, Redmond, WA (US)

(72) Inventors: Omar Alonso, Redwood Shores, CA (US); Travis Alexander Gingerich, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 14/503,670

(22) Filed: Oct. 1, 2014

(65) Prior Publication Data

US 2016/0097646 A1  Apr. 7, 2016

(51) Int. Cl.
*G01C 21/34* (2006.01)
*G06Q 30/02* (2012.01)

(52) U.S. Cl.
CPC .............. *G01C 21/34* (2013.01); *G06Q 30/02* (2013.01)

(58) Field of Classification Search
CPC .................................. G01C 21/34; G06Q 30/02
USPC .......................................................... 701/408
See application file for complete search history.

(56) References Cited

U.S. PATENT DOCUMENTS

| 2006/0241855 A1* | 10/2006 | Joe ..................... G06Q 10/047 |
| | | 701/533 |
| 2010/0082247 A1* | 4/2010 | Klein ..................... G01C 21/20 |
| | | 701/533 |
| 2011/0035142 A1* | 2/2011 | Tang .................. G01C 21/3617 |
| | | 701/532 |
| 2011/0202514 A1 | 8/2011 | Singh |

(Continued)

FOREIGN PATENT DOCUMENTS

| EP | 1191467 A1 | 3/2002 |
| EP | 2515270 A1 | 10/2012 |

OTHER PUBLICATIONS

Silvestri, et al., "A Trajectory-Based Recommender System for Tourism", In Proceedings of the 8th international conference on Active Media Technology, Dec. 4, 2012, 8 pages. http://www.academia.edu/2832380/A_Trajectory-Based_Recommender_System_for_Tourism.

(Continued)

*Primary Examiner* — Khoi H Tran
*Assistant Examiner* — Rodney P King
(74) *Attorney, Agent, or Firm* — Medley, Behrens & Lewis, LLC (57) ABSTRACT

A user who is traveling through a region may receive information from a device, such as vehicle status (e.g., speed and fuel status); the current environment (e.g., ambient temperature and weather); the user's route (e.g., traffic and accident notification); and/or a content stream (e.g., a radio or podcast). However, such information may be unrelated to (Continued)

the user's focus or motivation for traveling, and may be distracting. The user may request and receive information about the travel topic, but some users may not have available attention and/or the impetus to initiate such requests. Instead, a device may detect a current location and direction of the user; predict the user's destination according to the current location and direction; and retrieve and present to the user one or more content items that are associated with the predicted destination (e.g., breaking news alerts involving an entity or organization located at the user's predicted destination).

19 Claims, 8 Drawing Sheets

(56) References Cited

U.S. PATENT DOCUMENTS

| | | | |
|---|---|---|---|
| 2012/0084248 A1 | 4/2012 | Gavrilescu | |
| 2012/0166431 A1* | 6/2012 | Brewington | G06F 16/9537 707/724 |
| 2012/0191726 A1 | 7/2012 | Markus et al. | |
| 2013/0066703 A1 | 3/2013 | Razy et al. | |
| 2013/0238241 A1* | 9/2013 | Chelotti | G01C 21/3617 701/533 |
| 2013/0281047 A1* | 10/2013 | Daly | H04W 4/90 455/404.1 |
| 2013/0332297 A1 | 12/2013 | Forutanpour | |
| 2014/0129143 A1* | 5/2014 | Dave | G01C 21/3407 701/537 |
| 2014/0278070 A1* | 9/2014 | McGavran | G01C 21/00 701/465 |
| 2015/0339837 A1* | 11/2015 | Macfarlane | G06T 11/60 345/634 |

OTHER PUBLICATIONS

Amini, et al., "Trajectory-Aware Mobile Search", In Proceedings of the SIGCHI Conference on Human Factors in Computing Systems, May 5, 2012, 4 pages. http://research.microsoft.com/en-us/um/people/teevan/publications/papers/chi12-trajectory.pdf.

Bao, et al., "A Survey on Recommendations in Location-based Social Networks", In Proceedings of ACM Transaction on Intelligent Systems and Technology, Aug. 2013, 30 pages. http://cs.uef.fi/pages/franti/lami/papers/A%20Survey%20on%20Recommendations%20in%20Location-based%20Social%20Networks.pdf.

Wei, et al., "Exploring Pattern-Aware Travel Routes for Trajectory Search", In Proceedings of ACM Transactions on Intelligent Systems and Technology, vol. 4, No. 3, Jun. 1, 2013, 25 pages. http://dl.acm.org/citation.cfm?id=2483681.

Liu, et al., "A Survey of Context-Aware Mobile Recommendations", In International Journal of Information Technology & Decision Making, vol. 12, No. 1, Jan. 2013, 34 pages. http://staff.ustc.edu.cn/~cheneh/paper_pdf/2013/QiLiu-IJITDM13.pdf.

Yin, et al., "LCARS: A Location-Content-Aware Recommender System", In Proceedings of the 19th ACM SIGKDD international conference on Knowledge discovery and data mining, Aug. 11, 2013, 9 pages. http://www.cse.unt.edu/~huangyan/6350/paper/LCARS.pdf.

Waga, et al., "Recommendation of Points of Interest from User Generated Data Collection", In Proceedings of 8th International Conference on Collaborative Computing: Networking, Applications and Worksharing, Oct. 14, 2012, 6 pages. http://cs.joensuu.fi/sipu/pub/Recommend-CollaborateCom2012.pdf.

"International Search Report & Written Opinion Issued in PCT Application No. PCT/US2015/053376", dated Nov. 24, 2015, 12 Pages.

"International Preliminary Report on Patentability Issued in PCT Patent Application No. PCT/US2015/053376", dated Dec. 8, 2016, 8 Pages.

"Office Action Issued in Russian Patent Application No. 2017110790", dated Jul. 7, 2017, 3 Pages. (W/o English Translation).

"Second Written Opinion Issued in PCT Application No. PCT/US2015/053376", dated Aug. 19, 2016, 7 Pages.

* cited by examiner

| CONTENT ITEM | LOCATION | RELEVANCE / AGE | DESTINATION PROBABILITY | RANK |
|---|---|---|---|---|
| CONTENT ITEM 1 | LOCATION 1 | 85% / 12 DAYS | 80% | 1 |
| CONTENT ITEM 2 | LOCATION 2 | 95% / 47 DAYS | 85% | 2 |
| CONTENT ITEM 3 | LOCATION 3 | 90% / 2 DAYS | 60% | 3 |

CONTENT PRESENTATION BASED ON TRAVEL PATTERNS

BACKGROUND

Within the field of computing, many scenarios involve a user who is traveling within a region by foot, by mount, or within a vehicle. Some devices and services may assist a user in planning a travel period, such as a travel agency or trip planning service, and may present to the user a variety of information about available destinations.

During the actual travel period, various techniques may be utilized to enable devices to assist the user by providing information, such as global positioning system (GPS) mapping devices that display a map of the area, a route of the user, and nearby locations; vehicle status indicators that provide information about the status of the vehicle, such as speed, fuel level, and tire pressure; and environment sensors that provide information about the environment of the user, such as ambient temperature and the presence of traffic or accidents. In such scenarios, the user may also utilize a variety of devices to access content during a travel period. For example, the user may utilize a radio, audio library, or podcast to access a stream of audio content, or a tablet device to access content stored locally or retrieved from the internet.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Devices that present content to a user may not be configured to provide content that is relevant to the context of the travel. That is, such content may include information about the current local environment, the status of the vehicle, and the user's route; information that is personalized to the user, such as a stream of music that the user enjoys or has purchased; or a pregenerated media stream that is contextually unrelated to the user's travel, such as a generic radio stream. However, the presentation of such information may not pertain to the user's focus or motivation in embarking upon the travel, and may represent an active distraction from the focus or motivation of the travel period. The user may also be able to access content that is relevant to the user's travel, such as by preselecting media relating to the travel period and requesting a presentation of such media during the travel period; or by submitting requests during the travel period that relate to the focus or motivation of the travel, and receiving a presentation of such retrieved content by the device. However, the user may have to drive this experience, e.g., by initiating requests for content and specifying the type of content requested, and the device may simply fulfill the user's requests during the travel period. In many contexts (such as while the user is operating the vehicle), users may not have available attention and/or the impetus to initiate such requests, and may therefore not receive content that is relevant to the travel period.

Presented herein are techniques for configuring devices to provide content that is relevant to a travel period. In accordance with such techniques. In accordance with such techniques, a device may detect a current location and a current direction of the user during a current travel period. The device may also predict a destination of the user using the current location and current direction. The device may also identify a content item that is associated with the destination of the user, and present the content item associated with the destination to the user during the current travel period. In this manner, the device may retrieve and present information to the user that is associated with the user's predicted destination, without depending upon the involvement of the user to drive the presentation of content, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Figure 1:
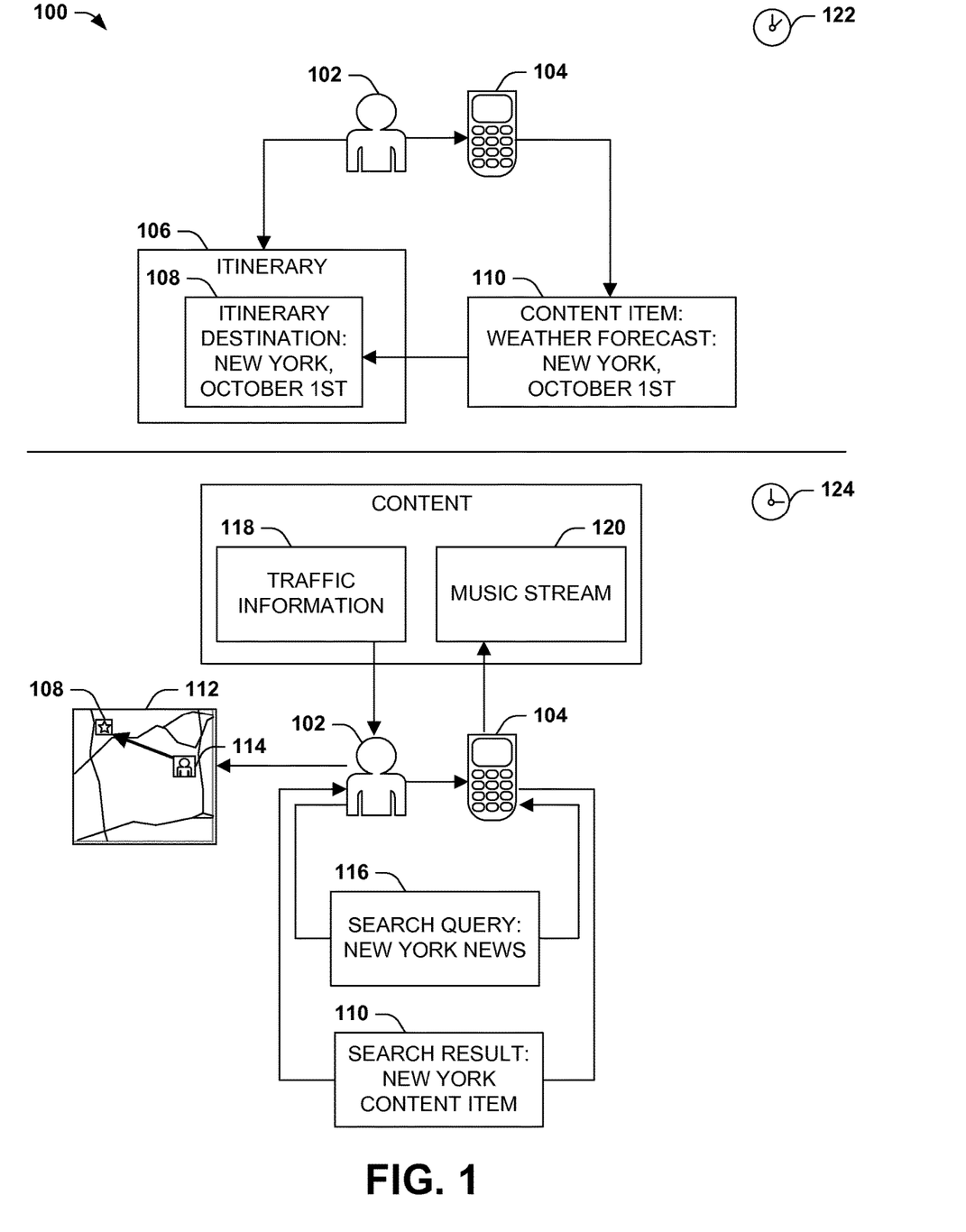
FIG. 1 is an illustration of an example scenario featuring a presentation of information to a user before and during a travel period.

FIG. 1 is an illustration of an example scenario 100 featuring example scenarios whereby a user 102 of a device 104 may receive content in association with a travel period 112.

In this example scenario 100, at a first time 122, the user 102 may utilize the device 104 while planning the travel period 112. For example, the user 102 may develop an itinerary 106 by utilizing the device 104 to identify destinations 108 that are of interest to the user 102; to schedule the date and time of the travel period 108; to choose a route for the travel period 112 from an origin to a selected destination 108; and to make travel reservations (such as renting a car or booking a flight) for the travel period 112. At this first time 122, the device 104 may assist the user 102 in a variety of ways; e.g., the device 104 may present content items 110 relating to the destination 108, such as a weather forecast for the destination 108 during the future travel period 112.

At a second time 124, during the travel period 112, the user 102 may utilize the device 104 in a variety of ways that may facilitate the travel period 112. As a first such example, the device 104 may present various types of content to the user 102 about the status of the vehicle (e.g., speed, fuel status, and tire pressure). As a second such example, the device 104 may present information to the user 102 about the route of the user during the travel period 112 between a current location 114 of the user 102 and a destination 108, such as turn-by-turn directions; traffic information 118; and the presence of nearby locations, such as food and fuel depots. As a third such example, the device 104 may present information to the user 102 about the local environment, such as the ambient temperature at the user's current location, or the development of an accident or road hazard in the vicinity of the user's current location 114. As a fourth such example, the device 104 may present content to the user 104, such as a music stream 120 from a radio or selected from the user's music library, a podcast, or an audiobook. As a fifth such example, a user 102 who is not operating a vehicle may view a set of visual content presented by the device 104, such as a video, photo album, or digital book.

Additionally, the user 102 may request content from the device 104 about a variety of topics. For example, a user 102 of a mobile device 104 having an internet connection, such as a phone or tablet, may initiate a search query 116 for information about a specified topic, and the device 104 may present search results that identify content items 110 relating to the specified topic. As one example, the user 102 may provide a search query 116 relating to the focus or motivation of the travel period 112, such as information about the user's destination 108, and the device 104 may fulfill the search query 116 and present the requested content item 110 to the user 102. In this manner, the device 104 may present various forms of content to the user 102 during the travel period 112.

However, the example scenario 100 of FIG. 1 may exhibit some limitations in the presentation of content to the user 102. In particular, while such content presented by the device 104 may relate to the user's current location 114 or interests, or may have no relation to the user 102 at all (e.g., as a public radio broadcast), the content may not relate to the focus or motivation of the travel period 112, such as the user's 102 reason for embarking on the trip. If the mind of the user 102 is occupied with the focus or motivation of the travel period 112, the presentation of unrelated content items 110 may impose a distraction to the user 102. As a second such example, the user 102 may actively request information about the focus or motivation of the travel period 112 (e.g., by preloading content items 110 onto the device 104 that relate to the travel period 112, or by initiating a search query 116 for such content items 110 during the travel period 112), but some users 102 may not have available attention to initiate such requests (e.g., the user 102 may be operating a vehicle), and/or may simply not have the impetus to initiate such a request. As a third such example, the user 102 may not have prepared for the travel period 112 (e.g., a spontaneous trip to a friend's house or a different city), and/or the device 104 may not have been notified in advance of the travel period 112. As a fourth such example, the destination 108 of the user 102 may change during the travel period 112; e.g., the user 102 may be spontaneously motivated to selected a different destination 108 than at the start of a travel period 112, and/or may experience circumstances (such as a phone call) that cause the user 102 to alter the itinerary 108 to include a new destination 108. Many such limitations may arise in scenarios wherein devices 104 present content items 110 to a user 102 that is not related to the focus or motivation of a travel period 112.

B. Presented Techniques

Figure 2:
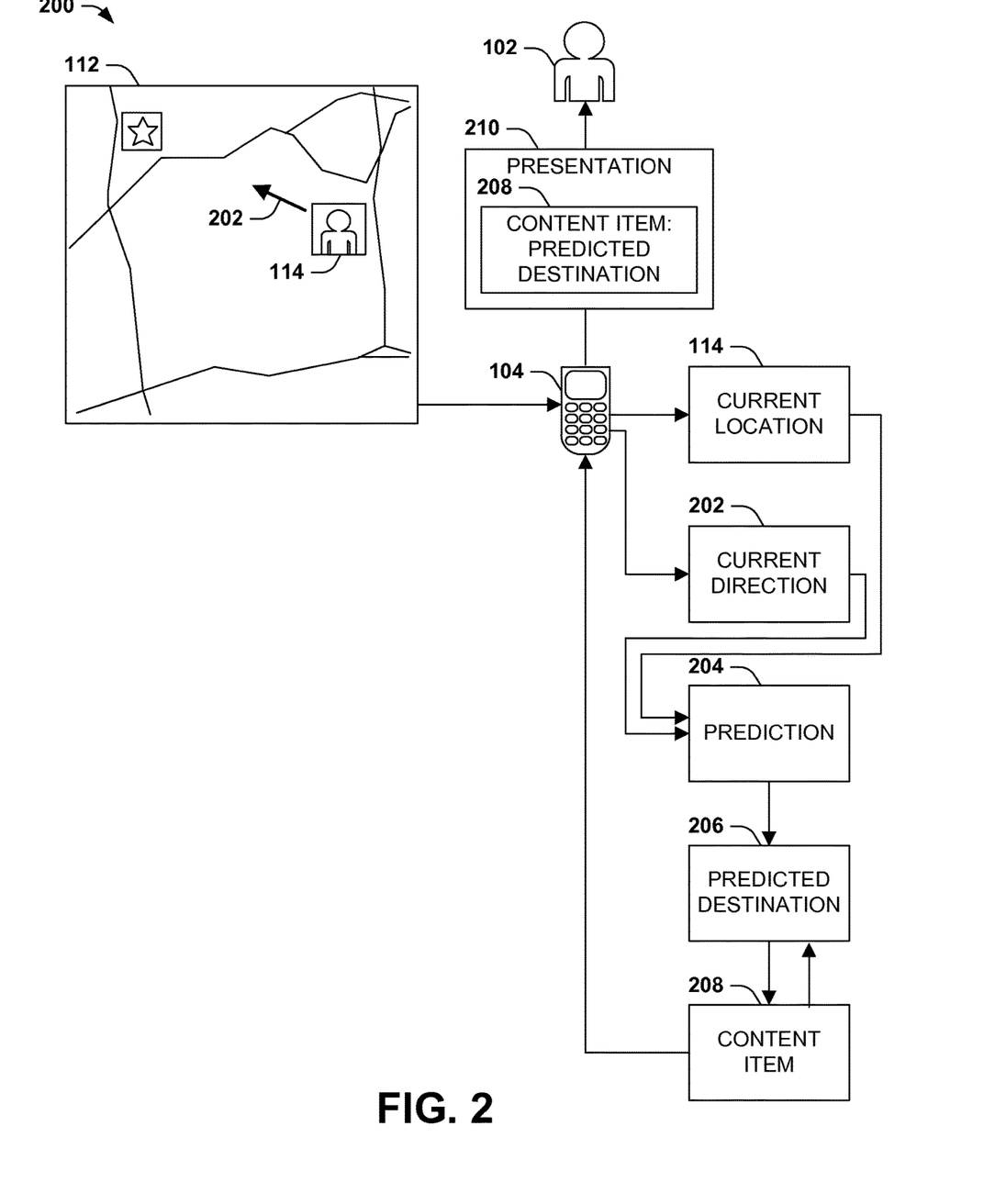
FIG. 2 is an illustration of an example scenario featuring a presentation of a content item to a user that relates to a predicted destination of the user, in accordance with the techniques presented herein.

FIG. 2 presents an illustration of an example scenario 200 wherein a device 104 presents content items 208 to a user 102 during a travel period 108 that relate to a predicted destination 206 of the user 102 in accordance with the techniques presented herein.

In the example scenario 200 of FIG. 2, the user 102 of a device 104 engages in a travel period 112, wherein, at a particular moment in time, the user 102 has a current location 114 and a current direction 202 in which the user 102 is heading. A device 104 of the user 102 may detect the current location 114 and the current direction 202 of the user 102, and may initiate a prediction 204 of a destination 206 of the user 102 according to the current location 114 and the current direction 202 (e.g., by identifying locations that are within the path of the user 102 projected from the current location 114 and the current direction 202). The device 104 may then retrieve one or more content items 208 that are associated with the predicted destination 206, and may generate a presentation 210 of the content item 208 to the user 102. In this manner, the device 104 may present content items 208 to the user 102 that are related to the focus or motivation of the travel period 112, in accordance with the techniques presented herein.

C. Technical Effects

The use of the techniques presented herein to present content items 208 to a use 102 that are related to a predicted destination 206 may result in a variety of technical effects.

As a first example of a technical effect that may be achievable by the techniques presented herein, a device 104 may present content items 208 to the user 102 that are contextually related to the user's destination 108, rather than content items 110 that are not related to the user's destination 108 and that therefore cause a distraction from the focus or motivation of the travel period 112. Such presentation may therefore enable a more accurate and user-responsive adaptation of the content presented to the user 102, and particularly in a context where the user 102 may be particularly sensitive to distractions.

As a second example of a technical effect that may be achievable by the techniques presented herein, such devices 104 may present content items 208 to the user 102 in a manner that does not depend upon the user 102 explicitly specifying the destination 108 to the device 104. As a first such example, if the user 102 spontaneously engages in the travel period 112 without preplanning, the device 104 may automatically configure the presentation of content items 208 to the circumstances of the user 102 without awaiting a specific instruction from the user 102 to do so. Moreover, if the user's circumstances change and lead to the selection of a new destination 206, the techniques presented herein enable an automated adaptation of the device 104 to the updated circumstances of the user 102 without awaiting explicitly specified information from the user 102 and/or an explicit request to do so.

As a third example of a technical effect that may be achievable by the techniques presented herein, a device 104 may present content items 208 to the user 102 in a manner that does not depend upon the user's available attention or impetus, such as while the user 102 is operating a vehicle. Such presentation may therefore adapt the provision of content to the context of the user 102 in scenarios where the user's attention is not available to guide such presentation. These and other technical effects may be achievable through the configuration of the device 104 to present content items 208 to the user 102 in accordance with the techniques presented herein.

D. Example Embodiments

Figure 3:
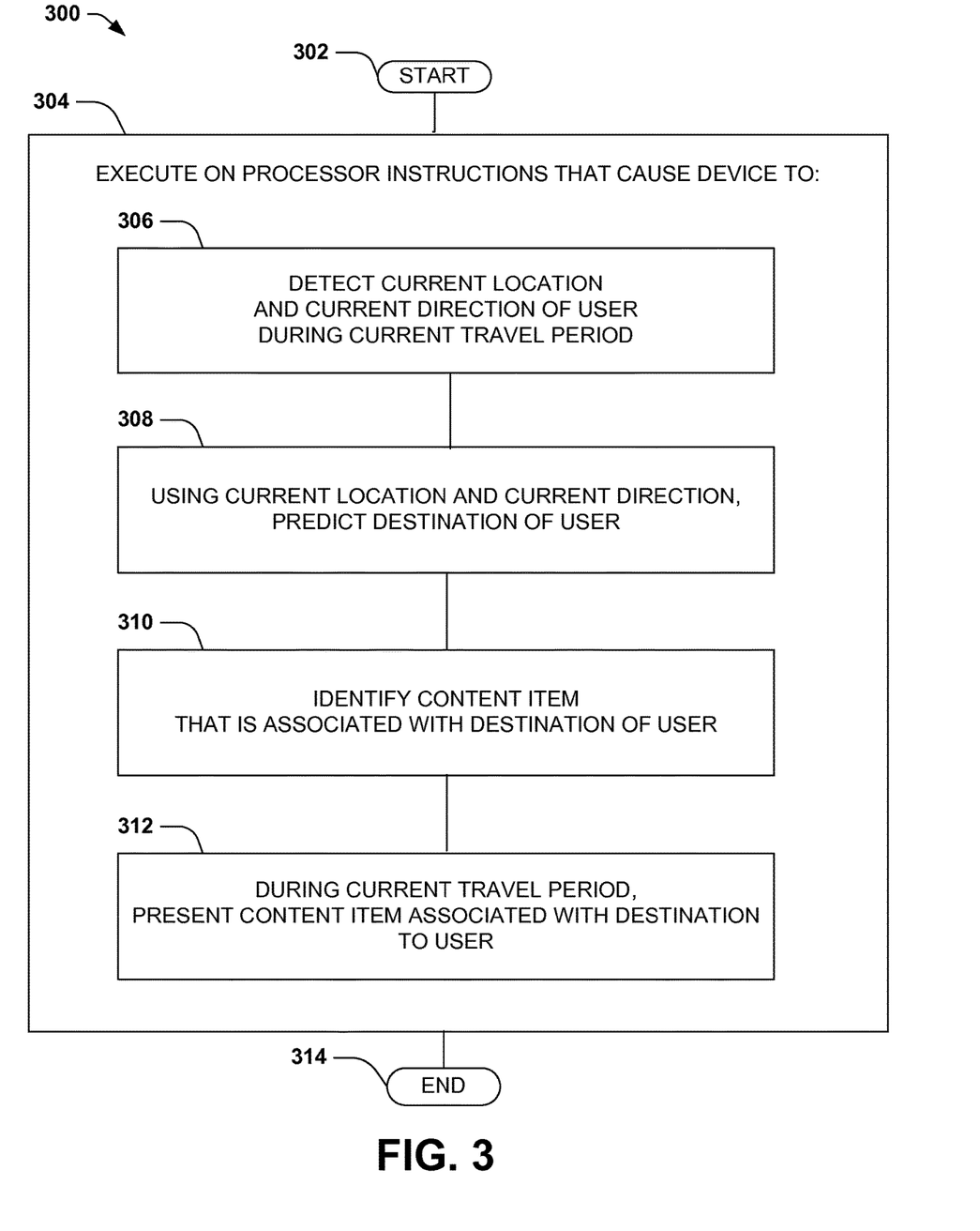
FIG. 3 is a flow diagram of an example method of presenting content items to a user of a device during a travel period, in accordance with the techniques presented herein.

FIG. 3 presents a first example embodiment of the techniques presented herein, illustrated as an example method 300 of configuring a device 104 to present content items 208 to a user 102 that relate to a predicted destination 206 of the user 102. The example method 300 may be implemented, e.g., as a set of instructions stored in a memory component of the device 104, such as a memory circuit, a platter of a hard disk drive, a solid-state storage device, or a magnetic or optical disc, and organized such that, when executed on a processor of the device, cause the device 104 to operate according to the techniques presented herein.

The example method 300 begins at 302 and involves executing 304 the instructions on a processor of the device. Specifically, executing 304 the instructions on the processor causes the device 104 to 306 detect a current location 114 and a current direction 202 of the user 102 during a current travel period 112. Executing 304 the instructions on the processor also causes the device 104 to, using the current location 114 and current direction 202, predict 308 a destination 206 of the user 102. Executing 304 the instructions on the processor also causes the device 104 to identify 310 a content item 208 that is associated with the destination 206 of the user 102. Executing 304 the instructions on the processor also causes the device 104 to, during the current travel period 112, present 312 the content item 208 associated with the destination 206 to the user 102. In this manner, the instructions cause the device 104 to present content items 208 to the user 102 that are contextually related to the focus or motivation of the travel period 112 in accordance with the techniques presented herein, and so ends at 314.

Figure 4:
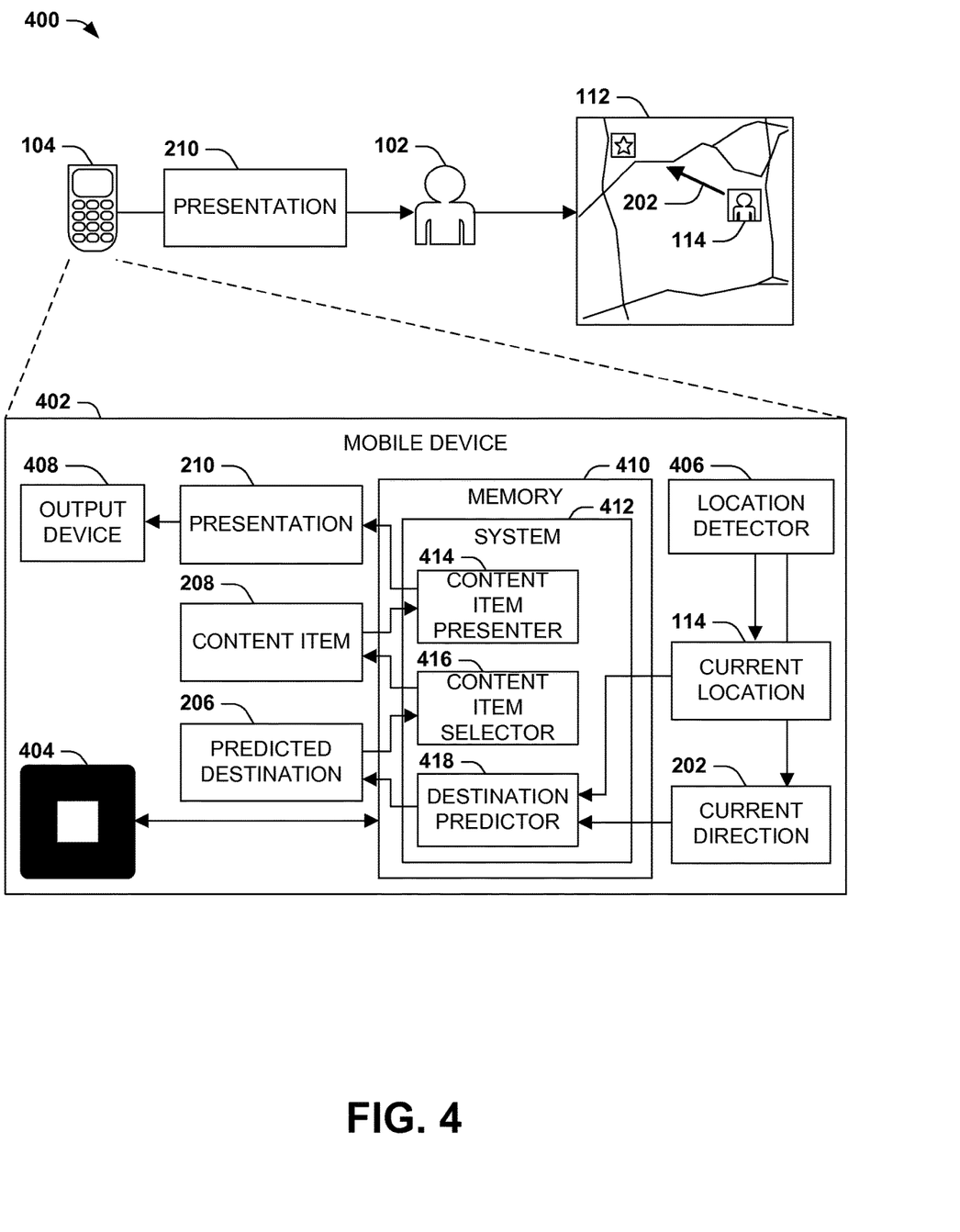
FIG. 4 is a component block diagram of an example system provided to present content items to a user of a device during a travel period, in accordance with the techniques presented herein.

FIG. 4 presents a second example embodiment of the techniques presented herein, illustrated as an example system 412 implemented on an example mobile device 402 featuring a processor 404, a location detector 406 that detects a current location 114 and a current direction 202 of the user 102 during a current travel period 112, and an output device 408, such as a display or a set of speakers. The example system 412 may be implemented, e.g., as a set of components respectively comprising a set of instructions stored in the memory 410 of the example mobile device 402, where the instructions of respective components, when executed on the processor 404, cause the mobile device 402 to operate in accordance with the techniques presented herein.

The example system 412 comprises a destination predictor 418, which, using the current location 114 and current direction 202 of the user 102, predicts a destination 206 of the user 102. The example system 412 also comprises a content item selector 416, which identifies a content item 208 that is associated with the predicted destination 206 of the user 102. The example system 412 also comprises a content item presenter 414, which, during the current travel period 112, presents the content item 208 associated with the destination 206 to the user 102 through the output component 408. In this manner, the example system 412 enables the example mobile device 402 to present content items 208 to the user 102 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
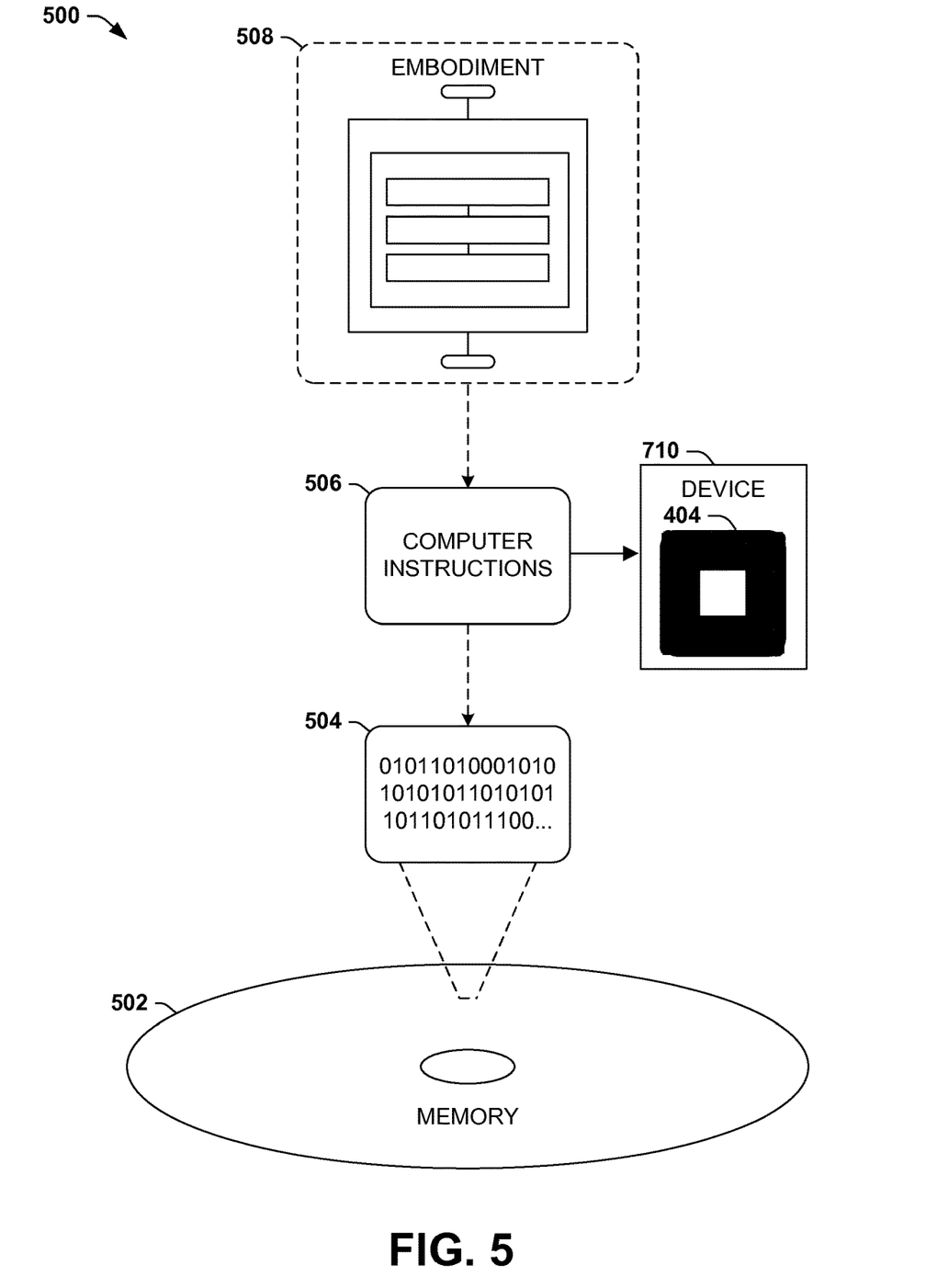
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510, cause the device 510 to operate according to the principles set forth herein. In a first such embodiment, the processor-executable instructions 506 may cause the device 510 to perform a method of presenting content items 208 to a user 102, such as the example method 300 of FIG. 3. In a second such embodiment, the processor-executable instructions 506 may cause the device 510 to implement a system that presents content items 208 to a user 102, such as the example system 412 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example system 412 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 104, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with may types of travel periods 112 of one or more users 102. As a first such example, the travel period 112 may comprise a long-distance journey from a first city or country to a second city or country; a short-distance journey across a city; or localized travel within a neighborhood or park. As a second such example, the travel period 112 may comprise a repeating pattern, such as a daily commute; a particularly planned trip to a destination 206; and/or a spontaneous trip with or without a preselected destination 206. As a third such example, the travel period 112 may involve many modes of transportation, such as a pedestrian travel period 112 involving travel through an area by foot (e.g., walking, hiking, jogging, skating, or skiing); travel by the user 102 while mounted on an animal such as a horse; and/or travel by the user 102 in a vehicle, such as an automobile, boat, or airplane. Moreover, the user 102 may be operating the vehicle, or may be a passenger within the vehicle; and may be an owner of the device 104, may interact with the device 104, and/or may passively receive content from the device 104.

As a third variation of this first aspect, the techniques presented herein may relate to many types of destinations 206, such as geographic locations; residential or commercial buildings; events; or the locations of other individuals, animals, or device of interest to the user 102. Such destinations 206 may also include a terminal destination of the user 102; an intermediate stop of the user 102 en route to another destination 206; and a location near a route of the user 102 that may be associated with an entity that may be of interest to the user 102. These and other scenarios may be suitable for the presentation of content items 208 related to a predicted destination 206 of the user 102 in accordance with the techniques presented herein.

E2. Destination Prediction

A second aspect that may vary among embodiments of the techniques presented herein relates to the manner of predicting the destination 206 of the user 102 based on the current location 114 and the current direction 202 of the user 102.

As a first variation of this second aspect, the current location 114 and the current direction 202 of the user 102 may be detected in a variety of ways. As a first such example, the device 104 may comprise a mobile device featuring a location detector 406, such as a global positioning system (GPS) receiver, and may receive a current set of coordinates from the location detector 406 that indicate the current location 114 and the current direction 202 of the user 102. As a second such example, the device 104 may be capable of triangulating the current location 114 and the current direction 202 of the user 102 according to a detected proximity to objects at fixed and known locations, such as triangulation based on cellular communication towers or WiFi networks. As a third such example, the device 104 may be capable of detecting the current location 114 and current direction 202 of the user 102 based on an evaluation of the user's current environment, such as evaluating visual input from a camera to detect and identify known landmarks, and/or utilizing a lidar, sonar, and/or radar device. As a fourth such example, the device 104 may comprise a compass, accelerometer, and/or gyroscopic sensor that enable an evaluation of the velocity, acceleration, orientation, and/or heading of the user 102. As a fifth such example, the device 104 may receive a notification of the current location 114 and current direction 202 of the user 102 from another device, such as a wearable device that is attached to the user 102, or a camera with which the user 102 has captured an image that includes exchangeable image file format (EXIF) data indicating a location of the image.

As a second variation of this second aspect, a device 104 may predict the destination 206 of the user 102 by identifying an entity that is associated with at the destination. As a first such example, the entity may comprise a commercial or residential building that is located at the destination 206, and that is associated with an individual or organization. As a second such example, the entity may comprise an individual, organization, or event that is currently located at the destination 206 (e.g., a sports game that is currently occurring at a convention center). The device 104 may identify a content item 208 that is associated with the entity at the destination 206, and present the content item 208 associated with the entity to the user 102.

As a third variation of this second aspect, the user 102 may be associated with a destination set, comprising selected destinations 206 that are associated with the user 102 (e.g., locations that the user 102 has previously visited, or that are stored in a contact list of the user 102 representing other individuals and companies with which the user 102 has an association). Using the current location 114 and current direction 202, the device 104 may predict the destination 206 of the user 102 from among the selected destinations 206 of the destination set.

Figure 6:
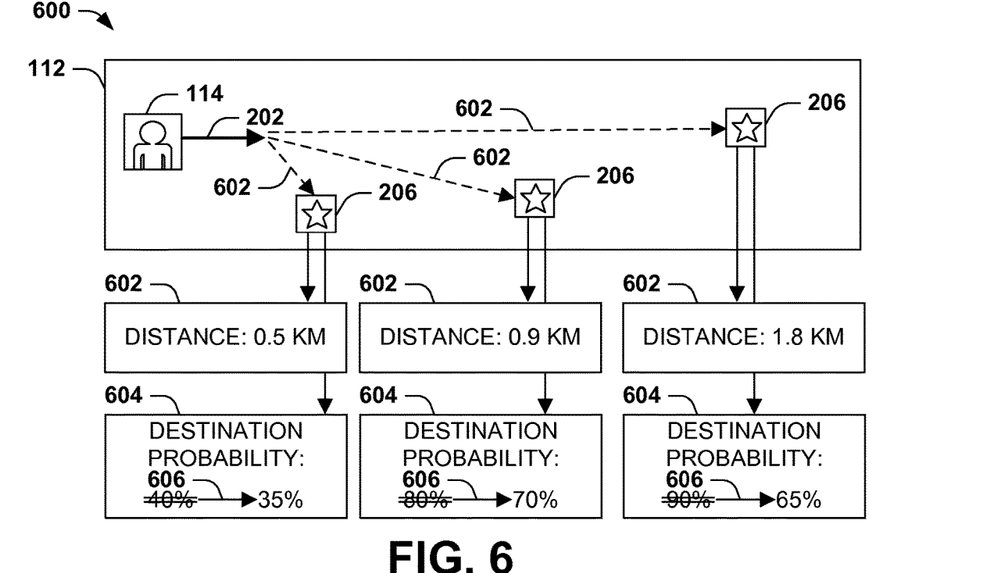
FIG. 6 is an illustration of an example scenario featuring a first technique for predicting a destination of a user during a travel period, in accordance with the techniques presented herein.

FIG. 6 presents an illustration of an example scenario 600 featuring a fourth variation of this second aspect, wherein the current location 114 and current direction 202 of the user 102 may suggest several possible destinations 206 of the user 102 (e.g., several locations of interest that are along a current path or trajectory of the user 102). For at least two locations of a location set, the device 104 may identify a probability 604 that the location is the destination 206 of the user 102. As one such example, the probability 604 may be calculated according to a determination of how directly the current direction 202 of the user 102 from the current location 114 is oriented toward the location (e.g., whether the user 102 is heading directly toward the destination 206, or is tangentially approaching the destination 206). As a second such example, the device 104 may decay the probability 604 of the location proportionally with a distance 602 between the location and the current location 114 of the user 102 (e.g., locations that the user 102 is near may suggest greater confidence in the probability 604 that the location is the destination 206 of the user 102 than locations that are farther away from the current location 114 of the user 102). As a third such example, the probability 604 of a destination 206 may be adjusted based on a magnitude of a user interest in the destination 206; e.g., the probability 604 of a first destination 206 that the user 102 has frequently visited may be increased, and the probability 604 of a second destination 206 that the user 102 has only visited once before may be diminished. As a fourth such example, the device 104 may compare the probabilities 604 of the respective locations in order to predict the destination 206 of the user 102; e.g., even if a particular destination 206 is associated with a comparatively low probability 604, the destination 206 may be identified as the selected destination 206 if no other destinations 206 have a higher probability 604.

As a fifth variation of this second aspect, the device 104 may trace a travel path of the user 102 from an earlier location, such as an origin, to the current location 114 of the user 102, and may detect the current direction 202 according to the travel path of the user 102 (e.g., as an arithmetic mean or mode direction of the user 102 along the travel path). Such tracing may enable a more accurate prediction of the destination 206 of the user 102, e.g., by disregarding temporary fluctuations in the direction 202 of the user 102.

Figure 7:
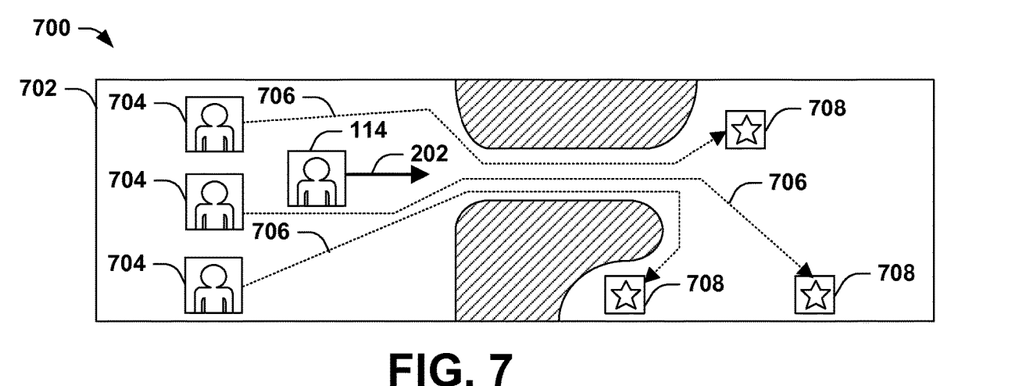
FIG. 7 is an illustration of an example scenario featuring a second technique for predicting a destination of a user during a travel period, in accordance with the techniques presented herein.

FIG. 7 presents an illustration of an example scenario 700 featuring a sixth variation of this second aspect, wherein the device 104 has access to a travel path set 702 comprising at least one travel path 706 that has been traveled by an individual 704 from the current location 114 of the user 102 to an individual destination 708 of the individual 704. For example, the travel path set 702 may represent other walking or driving routes that have been traveled by other individuals 704 in order to reach various individual destinations 708, which may facilitate the prediction of the destination 206 of the user 102. As one such example, the device 104 may identify a travel path 706 of another individual 704 that includes or approximates the current location 114 and current direction 202 of the user 102, and the destination 206 of the user 102 may be predicted according to the individual destination 708 of the selected travel path 706. Many such variations may be utilized to predict the destination 206 of the user 102 in accordance with the techniques presented herein.

E3. Selecting Content Items

A third aspect that may vary among embodiments of the techniques presented herein relates to the manner of selecting the content item 208 associated with the predicted destination 206 for presentation to the user 102.

As a first variation of this third aspect, the content item 208 may be retrieved from a variety of sources. As a first such example, the device 102 may have access to a social network, comprising social content items posted by individuals who are associated with the user 102. The device 104 may identify the content item 208 by selecting a social content item from the social network by an individual who is associated with the user 102, and where the social content item is associated with the predicted destination 206 of the user 102. In particular, such social content items may be retrieved from the social network that are predicted to be of interest to the user 102 and/or the associates of the user 102 within the social network. As another such example, the user 102 may be associated with a user profile indicating the user's interests, and content items 208 may be selected that relate to such user interests of the user 102.

As a second variation of this third aspect, the device 104 may have access to a content item set, comprising at least two content items 208 that are associated with a selected destination 206. The device 104 may rank the respective content items 208 of the content item set according to a relevance of the content item 208 to the destination 206, such as a significance of the destination 206 to the content item 208 (e.g., a first news story 208 that is centrally about the destination 206 may be ranked higher than a second news story 208 that only tangentially mentions the destination 206), and/or an age of the content item from the current travel period 112. The device 104 may identify a selected content item 208 according to the ranking of the respective content items 208 of the content item set.

As a third variation of this third aspect, for at least two locations, the device 104 may identify a probability of the location as the destination 206 of the user 102. The device 104 may predict the destination 206 according to the probability of the respective at least two locations, and may rank the respective content items 208 for the respective locations according to a relevance of the content item 208 to the location and also the probability of the location as the destination 206 of the user 102.

An example of a probability calculation that may be utilized in this context is expressed as the following mathematical formula:

$$\text{score} = \left(2 - \frac{d_1}{\text{path length}}\right) * e^{-\lambda_1 d_2 - \lambda_2 \alpha}$$

wherein:

$d_2$ represents a distance between a closest point along the path of the user 102 and the location of the content item 208;

$d_1$ represents a distance between the current location 114 of the user and the closest point along the path of the user 102;

$\alpha$ represents an age of the content item 208; and $\lambda_1, \lambda_2$ represent tuning constants that may be used to tune the relative significance of the respective parameters.

Figure 8:
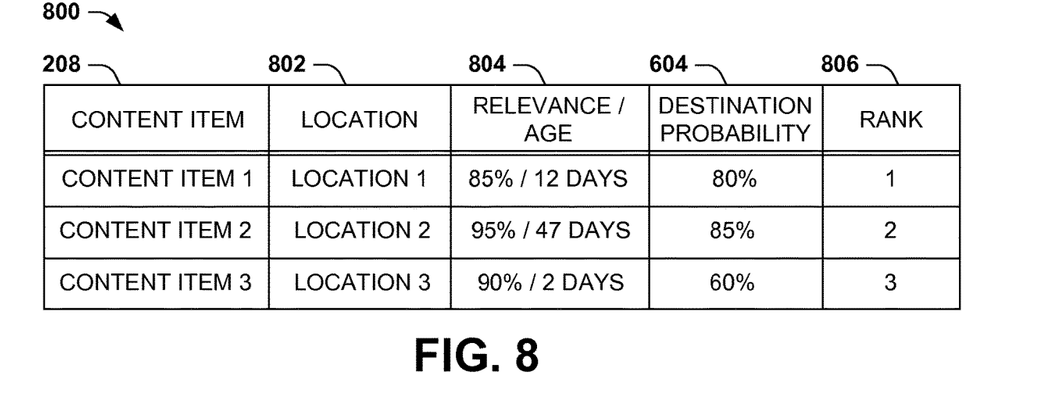
FIG. 8 is an illustration of an example scenario featuring a ranking of content items for presentation to a user, in accordance with the techniques presented herein.

FIG. 8 presents an illustration of an example scenario 800 featuring several such variations in the selection among content items 208 that may be presented to the user 102 in accordance with the techniques presented herein. In this example scenario 800, the respective content items 208 are associated with a location 802, and are ranked according to a relevance 804 of the content item 208 to the location 802, including an age of the content item 208. The content items 208 are also ranked according to a probability 604 that the location 802 is the destination 206 of the user 102. A ranking 806 among the content items 208 according to these properties may enable a selection among the content items 208 that may be presented to the user 102. Many such variations may be utilized in the selection of content items 208 for presentation to the user 102 in accordance with the techniques presented herein.

E4. Presentation of Content Item

A fourth aspect that may vary among embodiments of the techniques presented herein relates to the manner of presenting a selected content item 208 to a user 102.

As a first variation of this fourth aspect, a device 104 may periodically update the prediction of destinations 206 and the presentation of content items 208 relating to such predictions. For example, at a second time after first presenting the content item 208, detect an updated location 114 and an updated direction 202 of the user 102, and, using the updated location 114 and updated direction 20, predict an updated destination 206 of the user 102. The device 102 may then adjust the presentation of the content item(s) 208 according to the updated destination 206.

As a second variation of this fourth aspect, a device 104 may present to the user 102 a travel interface that indicates the current location 114 and the current direction 202 of the user 102, such as a map. The device 104 may also present one or more content items 208 to the user 102 concurrently with presenting the travel interface.

Figure 9:
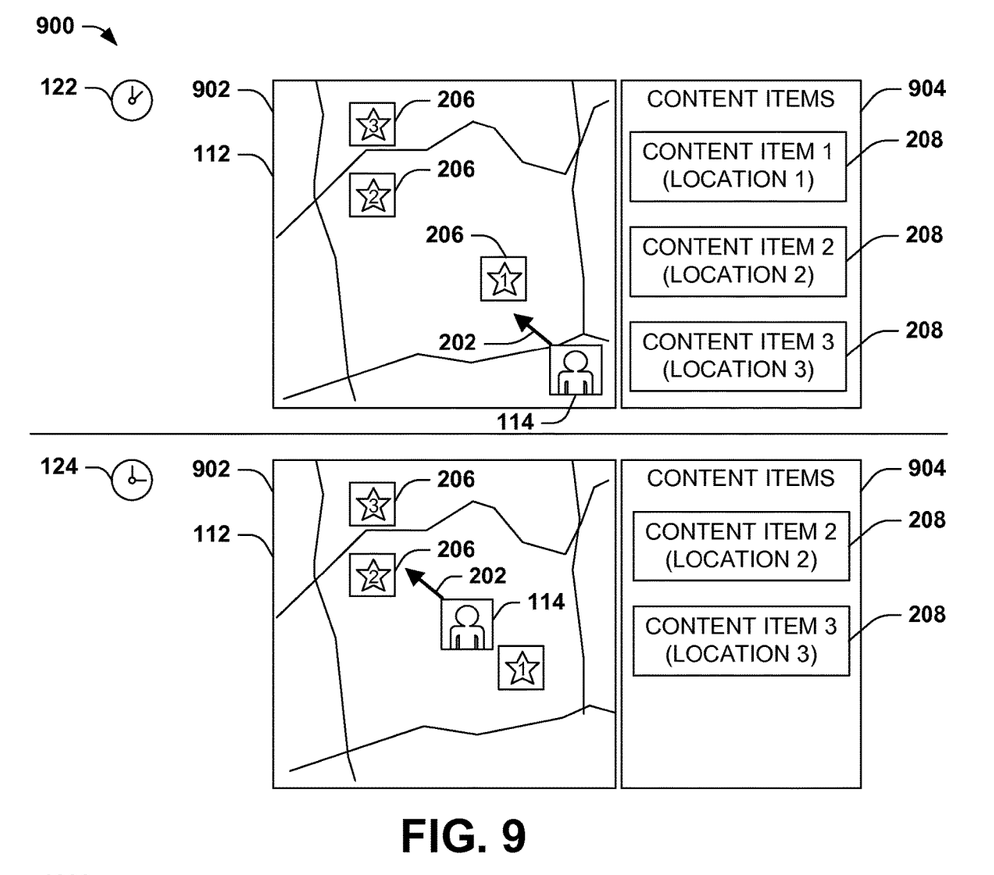
FIG. 9 is an illustration of an example scenario featuring a first technique for presenting content items to a user, in accordance with the techniques presented herein.

FIG. 9 presents an illustration of an example scenario 900 featuring several such variations of this fourth aspect. In this example scenario 900, the device 104 periodically updates the prediction of the destination 206 of the user 102, and the presentation of content items 208 related to such predictions. For example, at a first time 118 during the travel period 112, the device 104 may identify a first set of predicted destinations 206 that are consistent with the current location 114 and the current direction 202 of the user 102, and may identify a set of content items 208 that respectfully relate to one such destination 206. The device 104 may present a travel interface 902 to the user 102 that illustrates the current location 114 and the current direction 202, and also, concurrently, presents a set 904 of content items 208 for the respective predicted destinations 206 (e.g., in a summary form, such as a headline or summary of the content item 208). If the user 102 selects a content item 208 of the set 904, the selected content item 208 may be presented to the user 102 in full. At a second time 124, an updated location 114 and direction 202 of the user 102 may be detected that indicate that the user 102 has passed a particular destination 206. Accordingly, the set 904 of content items 208 may be updated to remove the particular location 206 that the user 102 has passed. In this manner, the device 104 may periodically update the prediction of destinations 206 and the presentation of content items 208 associated therewith.

As a third variation of this fourth aspect, the presentation of content items 208 of a content item set 904 may be sorted in various ways. As a first such example, for a content item set comprising at least two content items 208 that are associated with a particular destination 206, the device 104 may rank the respective content items 208 according to a relevance of the content item 208 to the destination 206. The device 104 may then present the content item set of the at least two content items 208 to the user 102, sorted according to the ranks of the respective content items 208. As a second such example, where respective content items 208 are associated with one of several predicted destinations 206, the device 104 may sort the content item set 904 according to a distance between the destination 206 and the current location 114 of the user 102.

As a fourth variation of this fourth aspect, the current travel period 112 of the user 102 may be associated with an interaction modality of the user 102. For example, while driving a vehicle, the user 102 may be capable of listening to audio content items 208, but not visual content items 208; and while traveling on a crowded train or bus, the user 102 may be able to view visual content items 208, but unable to hear audially presented content items 208. Accordingly, the device 104 may present the content item 208 formatted according to the interaction modality of the user 102 (e.g., using a text-to-speech interface to translate a visual text content item 208 to an audible format). As one such example, the device 104 may limit the consideration of content items 208 to be selected for presentation to the user 102 to a subset of content items 208 that are already formatted according to the interaction modality of the user 102.

As a fifth variation of this fourth aspect, the respective content items 208 may be associated with a priority, such as an urgency of the content item 208 (e.g., an emergency content item 208, or a relevance of the content item 208 to the user 102). The device 104 may present the content items 208 in a content item format that reflects the priority of the content item 208; e.g., urgent content items 208 may be presented to the user 102 in a high-visibility format, while medium-priority content items 208 may be offered to the user 102 as ordinary content items.

Figure 10:
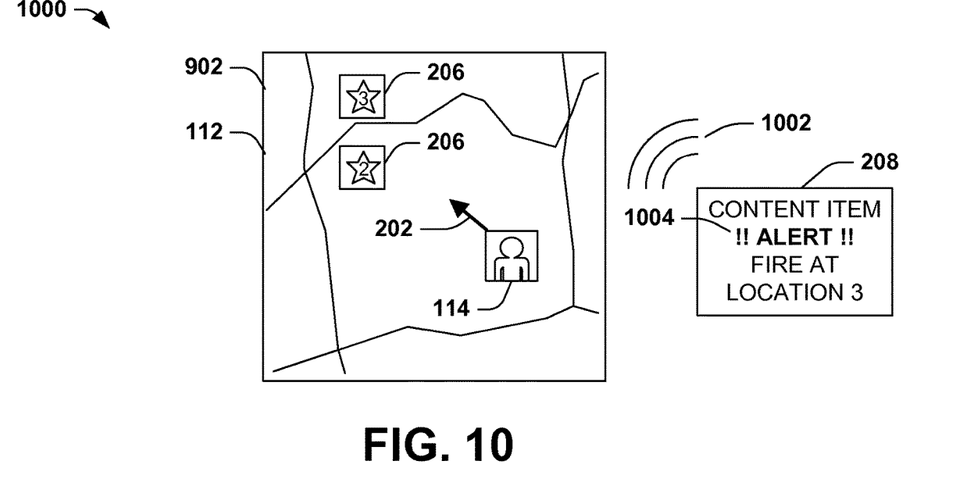
FIG. 10 is an illustration of an example scenario featuring a second technique for presenting content items to a user, in accordance with the techniques presented herein.

FIG. 10 presents an illustration of an example scenario 1000 featuring several such variations in the presentation of content items 208, wherein the device 104 presents a travel interface 902 to the user 102 indicating the respective destinations 206. The device 104 may also identify a modality 1002 in which the user 102 is able to receive content items 208 and/or matching the format of a content item 20, such as an audially presented content item 208. The device 104 may also identify a priority 1004 of the content item 208, and may select a format for the content item 208 that reflects the priority 1004 (e.g., increasing the audial volume of a high-priority content item 208, and/or interrupting a current audio presentation in order to present the high-priority content item 208). In this manner, the travel interface 902 may adapt the presentation of the content item 208 according to several variations of this fourth aspect of the techniques presented herein.

F. Computing Environment

Figure 11:
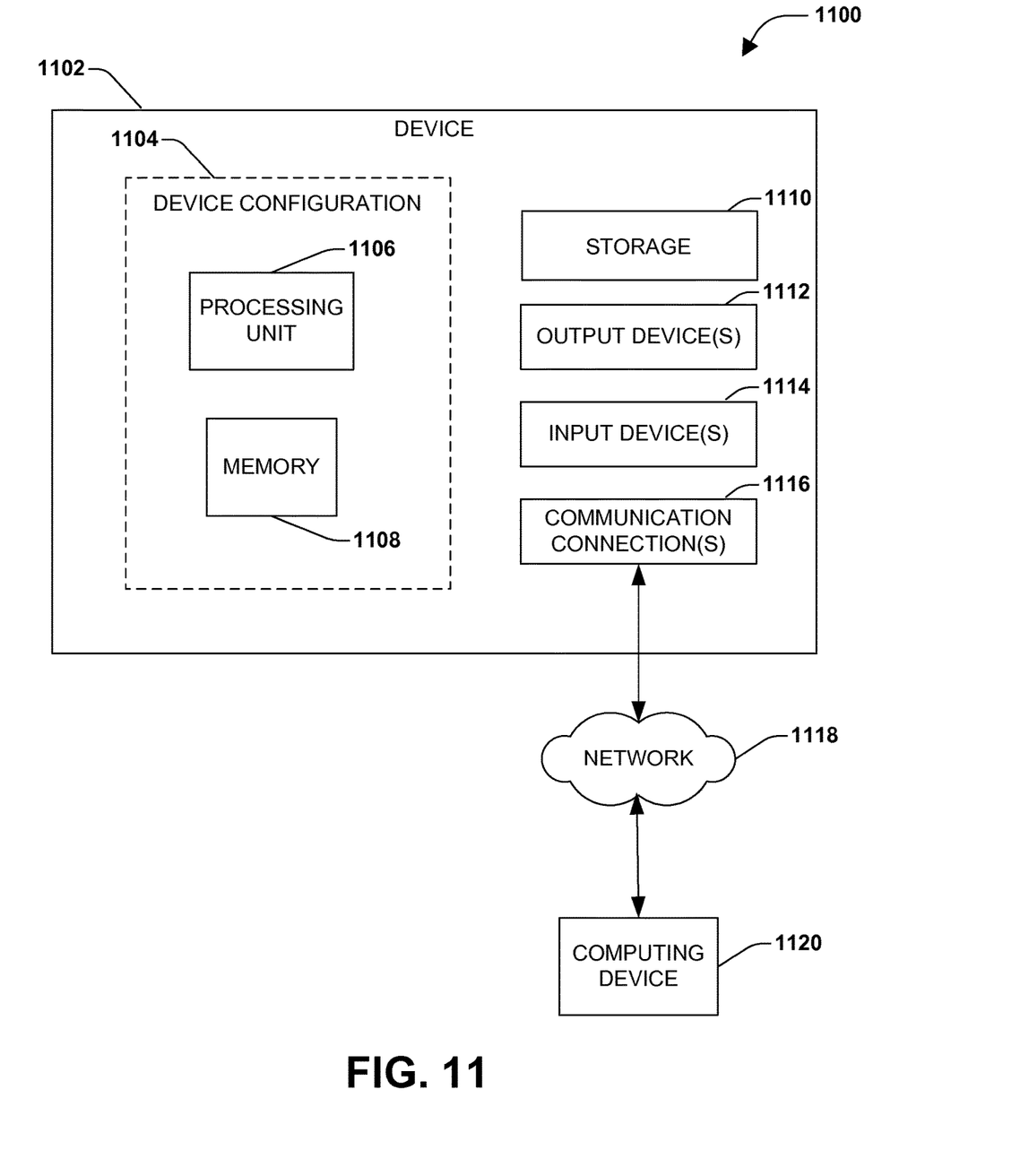
FIG. 11 is an illustration of an example computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes a processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1108 and storage 1110 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 920 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting content items to a user of a device having a processor, the method comprising: executing, on the processor, instructions that cause the device to:
    execute the following steps automatically and without user input to start the execution:
        detect a current location and a current direction of the user during a current travel period;
        identify a content item that is associated with a predicted destination of the user, wherein the content item is contextually related to a motivation of the current travel period; and
        during the current travel period, present the content item to the user from a subset of content items that are formatted for presentation to the user according to an interaction modality of the user.

2. The method of claim 1 further comprising:
    using the current location and current direction, predict the destination of the user;
    identifying an entity that is associated with the destination;
    identifying the content item further comprises identifying a content item that is associated with the entity that is associated with the destination of the user; and
    presenting the content item further comprises, during the current travel period, presenting the content item associated with the entity that is associated with the destination of the user.

3. The method of claim 1, wherein predicting the destination further comprises:
    for respective at least two locations of a location set, identifying a probability of the location as the destination of the user; and
    predicting the destination according to the probability of the respective at least two locations.

4. The method of claim 1, wherein the content item comprises an associated a priority and wherein the content item is presented in a content item format that reflects the associated priority.

5. The method of claim 4, wherein the priority may be an emergency.

6. The method of claim 4, wherein the priority may be a relevance of the content item.

7. A device that presents content items to a user, comprising:
    a processor;
    an output component;
    a location detector that detects a current location and a current direction of the user during a current travel period; and
    a memory storing instructions that, when automatically executed by the processor without user input to start the execution, provide:
        a content item selector that identifies a content item that is associated with a predicted destination of the user, wherein the content item is contextually related to a destination of the current travel period; and
        a content item presenter that, during the current travel period, presents the content item associated with the current travel period to the user through the output component, wherein the presented content item is from a subset of content items that are has been formatted for presentation to the user according to an interaction modality of the user.

8. The device of claim 7, wherein:
    the device has access to a social network comprising social content items posted by individuals who are associated with the user; and
    the content item selector identifies the content item by selecting a social content item from the social network by an individual who is associated with the user, and where the social content item is associated with the destination of the user.

9. The device of claim 7 further comprising:
    a destination predictor that, using the current location and current direction, predicts the destination of the user, wherein the content item selector identifies the content item by:
    for a content item set comprising at least two content items that are associated with the location, ranking respective content items according to a relevance of the content item to the destination; and identifying a selected content item according to the ranking of the respective content items of the content item set.

10. The device of claim 9, wherein the content item selector ranks the respective content items according to an age of the content item from the current travel period.

11. The device of claim 9, wherein:
the destination predictor predicts the destination by:
for respective at least two locations, identifying a probability of the location as the destination of the user; and
predicting the destination according to the probability of the respective at least two locations; and
the content item selector ranks the respective content items for respective locations according to a relevance of the content item to the location and the probability of the location as the destination of the user.

12. A memory storing instructions that, when executed by a processor of a mobile device, cause the mobile device to:
execute the following steps automatically and without user input to start the execution:
detect a current location and a current direction of the user during a current travel period;
identify a content item that is associated with a predicted destination of the user, wherein the content item is contextually related to a motivation of the current travel period; and
during the current travel period, present the content item associated with the current travel period to the user, wherein the presented content item is from a subset of content items that are formatted for presentation to the user according to an interaction modality of the user.

13. The memory of claim 12, wherein executing the instructions further causes the mobile device to:
using the current location and current direction, predict the destination of the user;
identifying an entity that is associated with the destination;
identifying the content item further comprises identifying a content item that is associated with the entity that is associated with the destination of the user; and
presenting the content item further comprises, during the current travel period, presenting the content item associated with the entity that is associated with the destination of the user.

14. The memory device of claim 12, wherein presenting the content item further comprises:
presenting to the user a travel interface indicating the current location and the current direction of the user; and
presenting the content item to the user concurrently with presenting the travel interface.

15. The memory device of claim 12, wherein the content item may be associated with a priority.

16. The memory device of claim 12, wherein the priority may be an emergency.

17. The memory device of claim 12, wherein:
identifying the content item further comprises, for a content item set comprising at least two content items that are associated with the location, rank respective content items according to a relevance of the content item to the destination; and
presenting the content item further comprises presenting, to the user, the content item set of the at least two content items that are associated with the location, and sorting the content item set according to the rank of the respective content items.

18. The memory device of claim 12, wherein:
predicting the destination further comprises:
for respective at least two locations of a location set, identifying a probability of the location as the destination of the user; and
predicting the destination according to the probability of the respective at least two locations; and
presenting the content item further comprises presenting, to the user, the content item set of the at least two content items that are respectively associated with a location of the location set, and sorting the content item set according to a distance between the location and the current location of the user.

19. The memory device of claim 12, wherein presenting the content item further comprises presenting the content item to the user in a content item format reflecting the priority of the content item.

* * * * *